United States Patent [19]
Genesky

[11] 3,958,259
[45] May 18, 1976

[54] FIRING SPRING COCKING MECHANISM

[75] Inventor: Leonard G. Genesky, Webster, N.Y.

[73] Assignee: Eastman Kodak Company, Rochester, N.Y.

[22] Filed: Nov. 29, 1974

[21] Appl. No.: 528,540

[52] U.S. Cl. .............................................. 354/135
[51] Int. Cl.² ...................................... G03B 15/03
[58] Field of Search ................................. 354/135

[56] References Cited
UNITED STATES PATENTS 3,677,153   7/1972   Box .................................... 354/135
3,735,679   5/1973   Winkler ............................. 354/135

*Primary Examiner*—John Gonzales
*Attorney, Agent, or Firm*—T. H. Close

[57] ABSTRACT

A firing spring cocking mechanism including a surface on a film advance slide, movable into engagement with a piezoelectric crystal firing spring during movement of the film advance slide, to move the firing spring to a latched position. A latch is provided to maintain the firing spring in its latched position prior to operation of the body release lever.

1 Claim, 2 Drawing Figures

FIRING SPRING COCKING MECHANISM

CROSS REFERENCE TO RELATED APPLICATIONS

Reference is made to commonly assigned, copending U.S. Patent Application Ser. No. 528,529, filed Nov. 29, 1974, in the names of Jerry L. Hargrave and Harold L. Malone; and entitled CAMERA FLASH SOCKET.

BACKGROUND OF THE INVENTION

1. Field of the Invention

The present invention relates to photographic apparatus and, more particularly, to an improved cocking mechanism for moving a piezoelectric firing spring to a latched position in such apparatus.

2. Description of the Prior Art

The use of a piezoelectric crystal to power a flash unit in photographic apparatus is known. See U.S. Pat. Nos. 2,856,564; 2,972,937 and 3,106,080. Recently, apparatus has been developed in which a plurality of flashlamps, each fireable by means of an electric pulse generated by a piezoelectric crystal, are assembled in a multilamp array. In one such array, as disclosed in more detail in copending U.S. Patent Application Ser. No. 528,529, all of the lamps are aligned in the same direction and each lamp has its own reflector. A switching mechanism is provided, internal to the array, for properly sequencing firing of the individual lamps. In photographic apparatus adapted to utilize such an array, a piezoelectric crystal striking mechanism must be provided, including a firing spring with an associated hammer, movable from a latched position to strike the piezoelectric crystal and thereby generate an electric pulse. In addition, a cocking mechanism must be provided for moving the firing spring to its latched position subsequent to each actuation.

SUMMARY OF THE INVENTION

Accordingly, it is an object of the present invention to provide an improved firing spring cocking mechanism for photographic apparatus;

It is a further object of the present invention to provide such an improved cocking mechanism to move a firing spring to a latched position in response to movement of the film advance slide;

It is a further object of the present invention to provide such an improved cocking mechanism that utilizes direct engagement of the film advance slide and the firing spring to move the firing spring to a latched position in response to movement of the film advance slide;

It is a further object of the present invention to provide such an improved cocking mechanism that is inexpensive to manufacture.

These and other objects of the present invention are provided by a photographic camera that includes a cocking mechanism in which a piezoelectric firing spring is mounted within the camera for movement between a latched position and a striking position. The piezoelectric firing spring is formed with a hammer and an intermediate section having a generally elongated, straight shape. The camera further includes a body release lever, a firing spring latch and a film advance slide. A surface on the film advance slide is movable into engagement with the intermediate section of the piezoelectric firing spring. During movement of the film advance slide, the surface engages the piezoelectric firing spring and moves it to a latched position in which the piezoelectric firing spring is engaged by the firing spring latch. Subsequent movement of the body release lever, to cause shutter operation of the camera, disengages the firing latch from the piezoelectric firing spring, permitting movement of the piezoelectric firing spring so that the hammer strikes the piezoelectric crystal.

DESCRIPTION OF THE DRAWINGS

In the detailed description of the preferred embodiment of the invention presented below, reference is made to the accompanying drawings in which.

DESCRIPTION OF THE PREFERRED EMBODIMENT

Because photographic apparatus is well known, the present description will be directed in particular to elements forming part of, or cooperating more directly with, the present invention. Elements not specifically shown or described herein are understood to be selectable from those known in the art.

Figure 1:
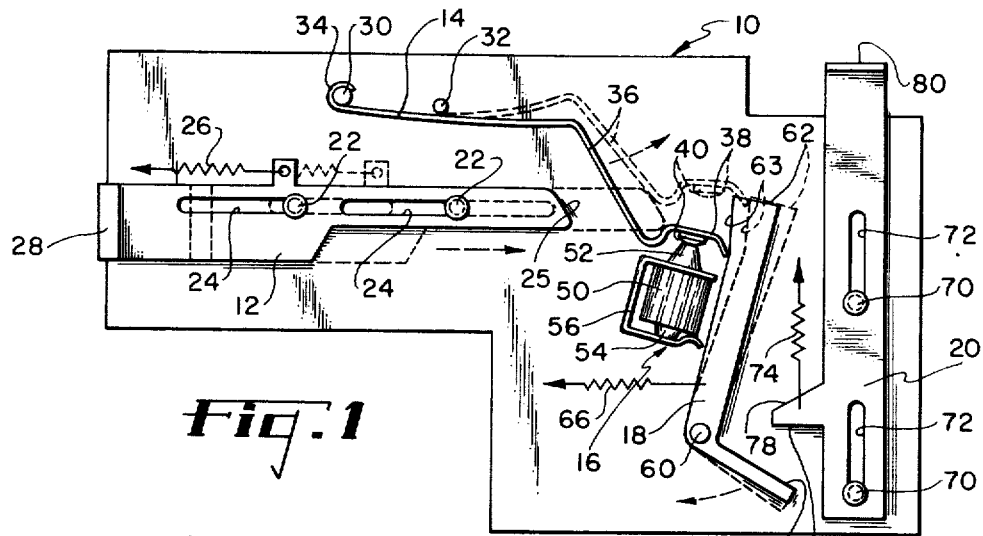
FIG. 1 is an elevation view of a cocking mechanism according to the present invention prior to movement of the piezoelectric firing spring to its latched position.

Referring now to FIG. 1, the photographic apparatus includes a housing shown generally as 10 on which are mounted a film advance slide 12, a piezoelectric firing spring 14, a piezoelectric generator 16, a firing spring latch 18 and a body release lever 20. Film advance slide 12 is movably mounted within the camera by means of a pair of pins 22, which are fixed within the camera and which extend through slots 24 in film advance slide 12. Film advance slide 12 includes a surface 25 and is biased to a rest position in which pins 22 engage the ends of slots 24 by means of a spring 26. Film advance slide 12 is movable from its rest position by operator engagement of a tab 28 which is accessible externally of the camera. Film advance slide 12 is tapered to form surface 25, which is in the form of a plane inclined to the path of movement of film advance slide 12.

Figure 2:
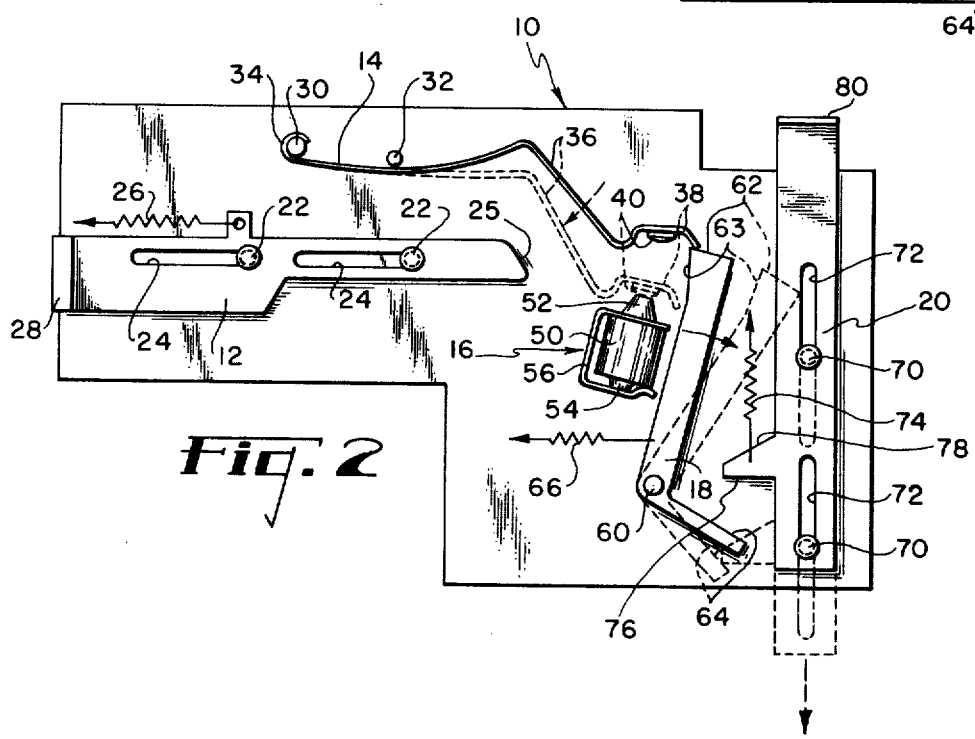
FIG. 2 is an elevation view of the cocking mechanism illustrated in FIG. 1 with the piezoelectric firing spring in its latched position.

Piezoelectric firing spring 14 is movably mounted within the camera by means of pins 30 and 32, which are fixed within the camera. Piezoelectric firing spring 14 consists of an elongated spring wire, which includes a fixed end 34, an intermediate portion 36 and a striker end 38 on which is formed a hammer 40. Fixed end 34 is formed around pin 30 and piezoelectric firing spring 14 engages pin 32 in both its striking position (FIG. 1) and its latched position (FIG. 2). Intermediate portion 36 is generally straight and lies in the path of movement of surface 25 on film advance slide 12.

Piezoelectric generator 16 includes a piezoelectric crystal 50, a first anvil 52 and a second anvil 54, first and second anvils 52 and 54 being positioned at opposed ends of piezoelectric crystal 50. As is known in the art, generator 16 may include one or more piezoelectric crystals with suitable electric contacts. Generator 16 is mounted by means of a spring clip shown generally as 56, which is fixed within the camera and engages anvils 52 and 54. While the electrical connections to generator 16 are not shown, it is understood that an electrical lead may be connected with each of anvils 52 and 54 and such leads may then be connected to other portions of the photographic camera, such as a socket for use with a multilamp photoflash array as is disclosed in copending U.S. Application Ser. No. 528,529, CAMERA FLASH SOCKET.

Firing spring latch 18 is movably mounted on a pin 60, fixed within the camera. Firing spring latch 18 includes a latch surface 62, a cam surface 63 and an unlatching surface 64. Firing spring latch 18 is biased in a counterclockwise direction about pin 60 by means of a spring 66 into engagement with piezoelectric firing spring 14.

Body release lever 20 is movably mounted by means of pins 70, which are fixed within the camera and which extend through slots 72 in body release lever 20. Body release lever 20 is biased by a spring 74 toward a rest position, as shown in FIG. 1, in which pins 70 engage the ends of slots 72. Body release lever 20 further includes a flash actuating surface 76, a cam surface 78 and a tab 80, accessible externally of the camera for operation by the photographer.

In the position shown in FIG. 1, the piezoelectric crystal striking mechanism is shown in its striking position in which hammer 40 has struck first anvil 52, thereby generating an electric pulse by means of piezoelectric generator 16. In order to return piezoelectric firing spring 14 to its latched position, the operator now engages tab 28 and moves film advance slide 12 from its rest position against the bias of spring 26. Surface 25 comes into engagement with intermediate portion 36 of piezoelectric firing spring 14, thereby moving piezoelectric firing spring 14 away from its striking position. By means of engagement of striker end 38 on piezoelectric firing spring 14 with cam surface 63, firing spring latch 18 is moved against the bias of spring 66 until striker end 38 travels past the end of cam surface 63 on firing spring latch 18. Firing spring latch 18 then moves to the left under the bias of spring 66 to the position shown in FIG. 2, so that, when film advance slide 12 is returned toward its rest position, striker end 38 is latched against latch surface 62. In this position, piezoelectric firing spring 14 has been flexed about pin 32 and moved to its latched position in which it is fully energized and in which it is maintained by firing spring latch 18. Film advance slide 12 is free to return to its rest position under the urging of spring 26 for subsequent operation to advance film within the camera or perform other operations as desired.

To provide subsequent generation of electrical energy by piezoelectric generator 16, the operator depresses tab 80 on body release lever 20, moving body release lever 20 in a downward direction. Flash actuating surface 76 comes into contact with unlatching surface 64 and continued movement of body release lever 20 rotates firing spring latch 18 in a clockwise direction against the bias of spring 66. During such movement, latch surface 62 disengages from striker end 38 on piezoelectric firing spring 14, permitting piezoelectric firing spring 14 to move from its latched position to its striking position in which hammer 40 strikes anvil 52. Movement of body release lever 20 may also initiate operation of the camera exposure mechanism, in any manner known in the art, with flash and shutter synchronization being achieved by the selection of a predetermined time sequence for unlatching of piezoelectric firing spring 14 and opening of the shutter mechanism. Downward movement of body release lever 20 is limited by pins 70 engaging the ends of slots 72. Upon release of tab 80 by the operator, body release lever 20 will return to its rest position under the urging of spring 74. Firing spring latch 18 will remain in its counterclockwise position, with striker end 38 engaging cam surface 63, until subsequent movement of piezoelectric firing spring 14 to its latched position by means of surface 25 on film advance slide 12.

The invention has been described in detail with particular reference to a preferred embodiment thereof, but it will be understood that variations and modifications can be effected within the spirit and scope of the invention.

I claim:

1. Photographic apparatus comprising:

means, including a piezoelectric crystal, for generating electrical energy;

a hammer;

a firing spring operatively engaged with said hammer and movable from a latched position to a striking position in which said hammer strikes said generating means;

a latch including a latch surface, a cam surface and an unlatching surface, said latch being mounted for movement between a latch position in which said latch surface is in engagement with and retains said firing spring in said latched position and an unlatched position in which said cam surface is engageable by said firing spring;

a body release lever including a flash actuating surface, said body release lever being movable to bring said flash actuating surface into engagement with said unlatching surface of said latch and further being movable while said flash actuating surface is in engagement with said unlatching surface to move said latch to said unlatched position; and a film advance slide having a surface, said film advance slide being mounted for movement to advance film within, the photographic apparatus, said film advance slide further being adapted during such movement to advance film to bring said surface into engagement with said firing spring, to move said firing spring to said latched position by engagement of said surface with said firing spring and thereby to move said latch to said latch position by engagement of said firing spring with said cam surface on said latch.

* * * * *